D. KARAMANOUS.
ACTUATING MECHANISM.
APPLICATION FILED MAY 28, 1920.

1,384,135.

Patented July 12, 1921.

Inventor
Demetrios K. Karamanous

By
Ch. Farben, Attorney

UNITED STATES PATENT OFFICE.

DEMETRIOS KARAMANOUS, OF DONORA, PENNSYLVANIA.

ACTUATING MECHANISM.

1,384,135.   Specification of Letters Patent.   Patented July 12, 1921.

Original application filed October 25, 1919, Serial No. 333,270. Divided and this application filed May 28, 1920. Serial No. 385,023.

*To all whom it may concern:*

Be it known that I, DEMETRIOS KARA-MANOUS, a citizen of the United States, residing at Donora, in the county of Washington and State of Pennsylvania, have invented certain new and useful Improvements in Actuating Mechanism, of which the following is a specification.

This invention relates to actuating mechanism for egg beaters, mixers, and the like, and is a division of my co-pending application Serial No. 333,270, filed October 25, 1919.

In my former application, I have disclosed an actuating mechanism for egg beaters, comprising a reciprocating rack and a pair of driven elements, one arranged within the other. The first element is provided with a central shaft and is driven by means of a gear meshing with the rack. The second element is arranged about the shaft, concentric thereto, and is driven by a train of gears from another gear meshing with the opposite side of the rack. In the said application, I have also disclosed means for reciprocating the rack, but the specific means disclosed therein are not specifically claimed in my co-pending application, and form the subject matter of the claims of the present application.

The means for reciprocating the rack comprises a pivoted handle attached to one end of the rack bar adapted to be operated to move the rack in one direction, a coil spring secured to the opposite end of the rack bar to return it to its original position, and means for supporting the coil spring comprising a bearing formed of a single piece of wire bent to produce a central bearing section and guides on each side of such bearing section and a clockwork spring arranged on the bearing section and adapted to receive the coil spring.

In the accompanying drawings, I have shown one embodiment of this invention. In this showing:

Figure 1:
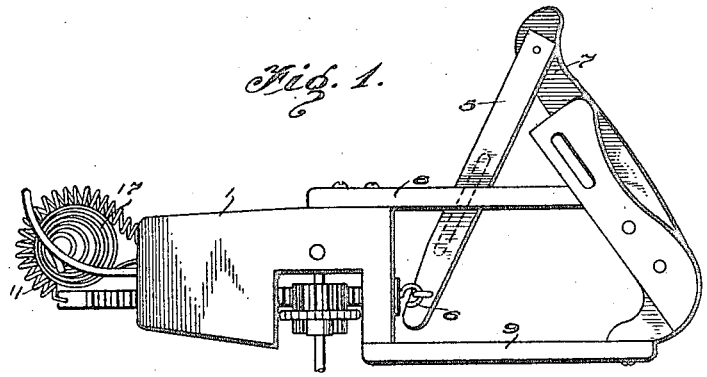
Figure 1 is a side elevation of the device.
Figure 2:
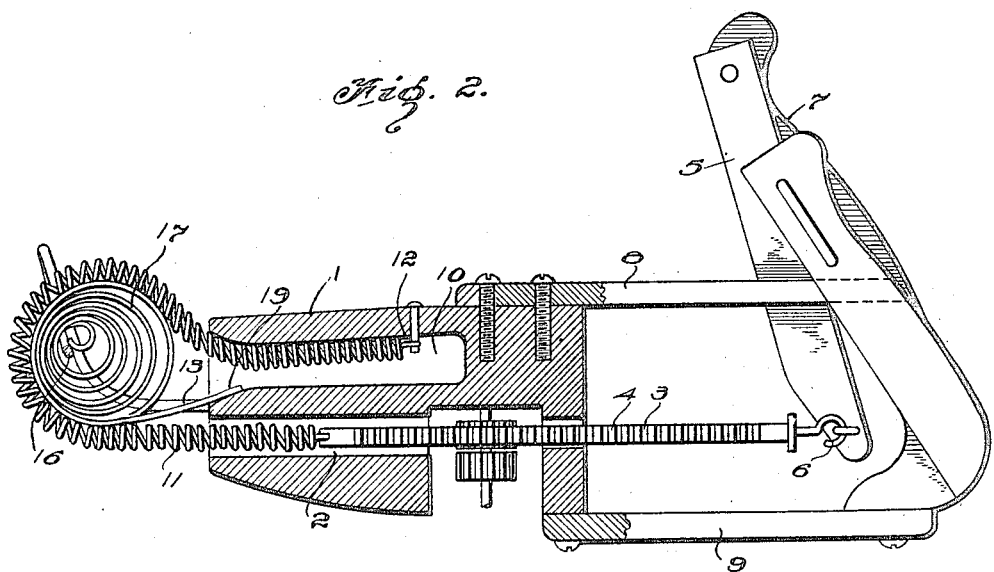
Fig. 2 is a longitudinal vertical sectional view.
Figure 3:
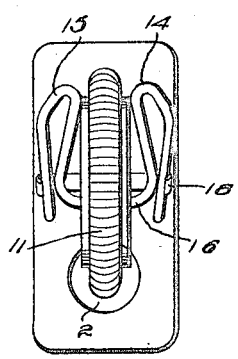
Fig. 3 is an end elevation.

Referring to the drawings, the numeral 1 designates a support or block which is provided with a recess 2 extending longitudinally thereof. A rack bar 3 is arranged to reciprocate in this recess and is provided with teeth 4 on opposite sides. An actuating handle 5 is secured to one end of the rack bar, as at 6, and this actuating handle is pivoted to a supporting bracket 7, as shown. The supporting bracket is arranged on arms 8 and 9, secured to the block 1. The block is provided with an upper recess 10 suitably spaced from the recess 2. A coil spring 11 is secured to one end of the rack and is adapted to resist the movement of the rack bar caused by the operation of the actuating handle to return the rack bar to normal position shown in Fig. 1 of the drawings. The free end of the coil spring is secured in the upper recess, as at 12, the intermediate portion being arranged around a suitable bearing.

The improved bearing for the coil spring is formed by a single piece of wire, the ends 13 of which are secured in the support and the intermediate sections bent to form guides or loops 14 and 15, arranged near a central bearing section 16. A coil clockwork spring 17 is arranged on the bearing section 16 having its inner end secured to the bar, as at 18. The outer end of the spring is received in the upper recess 10, as at 19, whereby the clockwork spring is free to contract and expand. The clockwork spring is normally in expanded position, the upper recess forming a guide for the free end.

When the rack bar 3 is moved toward the handle, the coil spring 11 is drawn about the clockwork spring compressing the latter. This action gives a very smooth and even expansion and contraction of the spring 11 and increases the amount of pull exerted to return the reciprocable rack bar to its normal position.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the type described, a reciprocable member, means for moving the member in one direction, a guide, a suitably supported clockwork spring having one end operating within the guide, and a coiled tension spring having one end fixed and extending about said clockwork spring, the free end of said tension spring being secured to said reciprocable member to move it in the opposite direction.

2. In a device of the type described, a body portion, a bar reciprocably mounted in the body portion, a recess formed in said body portion, a bearing, a clockwork spring having its inner end secured to said bearing and its free end disposed within said recess, a coiled tension spring having one end secured to the body portion and the other secured to said bar, said tension spring passing about said coiled spring, and means for moving the bar in one direction against the action of said tension spring.

3. In a device of the type described, a body portion, a bar reciprocably mounted in the body portion, a recess formed in said body portion, a bearing, said bearing being formed of a single piece of wire having its ends secured to the body portion and an intermediate bearing section, a clockwork spring having its inner end secured to said bearing and its free end disposed within said recess, a coiled tension spring having one end secured to the body portion and the other secured to said bar, said tension spring passing about said coiled spring, and means for moving the bar in one direction against the action of said tension spring.

4. In a device of the type described, a body portion, a bar reciprocably mounted in the body portion, a recess formed in said body portion, a bearing, said bearing being formed of a single piece of wire having its ends secured to the body portion and an intermediate bearing section, and loops formed on each side of said bearing section to form guides, a clockwork spring having its inner end secured to said bearing and its free end disposed within the recess, a coiled tension spring having one end secured to the body portion and the other secured to said bar, said tension spring passing about said coiled spring, and means for moving the bar in one direction against the action of said tension spring.

In testimony whereof I affix my signature in presence of two witnesses.

DEMETRIOS KARAMANOUS.

Witnesses:
MIKE BALARSCOTIS,
W. E. DALBEY.